United States Patent Office 3,786,021
Patented Jan. 15, 1974

3,786,021
POLYMERS OF 1-OLEFINS PROTECTED AGAINST ULTRAVIOLET LIGHT
Ronald D. Mathis, Taylors, and James S. Dix, Greenville, S.C., assignors to Phillips Petroleum Company
No Drawing. Filed Feb. 10, 1972, Ser. No. 216,742
Int. Cl. C08f 45/58
U.S. Cl. 260—45.75 N                           5 Claims

ABSTRACT OF THE DISCLOSURE

Homopolymers and copolymers of 1-olefins, e.g. of propylene and propylene and ethylene, respectively, are protected against the deleterious effects of ultraviolet light by incorporating therewith a synergistic combination of a hydroxybenzophenone, e.g. 2-hydroxy-4-n-octoxybenzophenone and an aromatic oxime metal complex, e.g. the metal ketoxime nickel bis(syn-methyl-2-hydroxy-4-methylphenylketoxime).

---

This invention relates to the stabilization of homopolymers and copolymers of 1-olefins against deleterious effects of ultraviolet light.

In one of its concepts the invention provides for the stabilization of a homopolymer of a 1-olefin and/or a copolymer of a 1-olefin with another 1-olefin by incorporating therewith a synergistic combination of a hydroxybenzophenone, e.g. 2 - hydroxy-4-n-octoxybenzophenone and a metal ketoxime, e.g. nickel bis(syn-methyl-2-hydroxy-4-methyl-phenylketoxime).

It is disclosed in the prior art to use as stabilizers for various resins or plastics such stabilizers as have been mentioned above. For example, in U.S. Pat. 3,459,703, issued Aug. 5, 1969, there are disclosed respectively, nickel bis(syn-methyl-2-hydroxy-4-methylphenylketoxime) and 2-hydroxy-4-n-octoxybenzophenone. It is also disclosed in the patent that these compounds, respectively, have been incorporated into polypropylene.

We have now discovered that the two known agents suitable for stabilizing against deleterious effects of UV light, when combined, exhibit more protection than an equal weight of each alone provides. The synergistic combination of such stabilizers or that exists is not disclosed in the art which, however, does suggest combinations, e.g. combination of the nickel chelate with various different other materials, including ultraviolet light absorbers.

Thus we have discovered the dramatic increase in hours to failure in tests in which the same quantity of a combination of two stabilizers was used as of each of them separately. More specifically, we have shown that whereas 0.5 part per hundred of 2-hydroxy-4-n-octoxybenzophenone (UV–531) and 0.5 part per hundred of nickel bis(syn - methyl - 2 - hydroxy - 4 - methylphenylketoxime) (NA), also known as Negopex A, a trademark, yielded respectively 487 and 420 hours, average, to failure, upon exposure to ultraviolet light of polypropylene containing the same 0.25 per hundred of each of these additives gave hours, average to failure, of 820, almost double the number of hours obtained with them individually.

It is an object of this invention to provide a method for stabilization of a polymer and/or a copolymer of a 1-olefin. It is another object of this invention to provide a polymer and/or a copolymer of a 1-olefin which is stabilized against degradation by UV light. It is a further object of this invention to provide a synergistic combination of UV-light stabilizers which will synergistically stabilize a polymer and/or a copolymer of a 1-olefin.

Other aspects, concepts, objects and the several advantages of this invention are apparent from a study of this disclosure and the appended claims.

According to the present invention, there is provided a method for the stabilization of a polymer and/or a copolymer of a 1-olefin by incorporating therewith a synergistic combination of a hydroxybenzophenone UV light stabilizer and an aromatic oxime UV light stabilizer.

In a specific embodiment of the invention, minor amounts of a nickel oxime as herein disclosed and of a hydroxybenzophenone incorporated in polypropylene provided excellent UV protection for the polymer.

Although the stabilizing system of the invention is now preferably applied to protecting polypropylene against the deleterious effect of UV light, it appears upon proper consideration made that copolymers of propylene with a minor amount of another 1-olefin, such as ethylene are also protected by the system. Further, polyolefins, such as homopolymers and copolymers derived from 1-olefins containing 2–8 carbon atoms per molecule and mixtures thereof are afforded protection by the ssytem.

The benzophenones which are useful in providing the synergistic combination of the invention have the following general formula

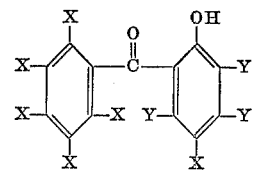

wherein the X-radicals are selected from the group consisting of hydrogen, hydroxyl, halogen (such as fluorine, chlorine, bromine and iodine, and preferably chlorine or bromine), nitro and R-radical of from one to about thirty carbon atoms; wherein the Y-radicals are selected from the group consisting of hydrogen, hydroxyl, halogen (such as fluorine, chlorine, bromine and iodine, and preferably chlorine or bromine) and R-radicals of from one to about thirty carbon atoms.

Within the above limitations, the X and Y radicals substituted on any ring or on different rings can be the same or different. That is, for instance, the para Y-radical can be an R-radical; while one ortho Y-radical can be the same or a different R-radical and the other ortho Y-radical can be a halogen; and the two meta Y-radicals can be hydrogen. The X-radical on the other ring can be an R-radical, or a different radical; and if an R-radical they can be the same, or different, from any Y-radicals which are R-radicals. Other combinations will be apparent to those skilled in the art.

The R-radical is an organic radical and can be selected from the group consisting of aliphatic, alicyclic, and heterocyclic groups of from one to thirty carbon atoms. However, there is no upper limit, other than impracticability, on the number of R carbon atoms. Typical R-radicals are alkyl, alkenyl, alkynyl, cycloalkyl, acyl, aryl, alkaryl, aralkyl, alkoxy, aryloxy, alkaryloxy, aralkoxy, oxyalkylene, hydroxyalkyl, and hydroxyalkylene radicals, and esters thereof with organic carboxylic acids. These R-radicals may, if desired, contain inert, non-reactive substituents such as halogen and other carbocyclic and heterocyclic ring structures.

Typical R-radicals are, for example, methyl, ethyl, propyl, isopropyl, butyl, isobutyl, t-butyl, amyl, isoamyl, n-octyl, isooctyl, 2-ethylhexyl, t-octyl, decyl, ethylnonyl, ethylmethyloctyl, diethylheptyl, undecyl, dodecyl, pentadecyl, octadecyl, tricosyl, and nonacosyl; allyl, hexenyl, linoleyl, ricinoleyl, oleyl, undecadienyl, propyloctadecenyl, propynyl, methoxy, n-butoxy n-octyloxy, 2-ethylhexyloxy, n-decyloxy, benzyloxy, acetoxy, benzoyloxy; hexynyl, ethylheptadecadiynyl, undecynyl; monochloroethyl, polychloroethyl, monobromopropyl, polybromopropyl, fluoroheptyl, chlorododecyl, chlorododecenyl, chlorododecynyl, chlorotricosyl; hydroxychlorononyl, hydroxybromodecyl, hydroxybromotricosyl; hydroxyethyl, hydroxypropyl, monohydroxyundecyl, dihydroxyundecyl, hydroxyundecenyl, hydroxyundecenyl, glyceryl, sorbityl pentaerythrityl, and polyoxyalkylene radicals such as those derived from diethylene glycol, triethylene glycol, polyoxyethylene glycol, polyoxypropylene glycol, and polyoxypropyleneoxyethylene glycol, and esters thereof with any of the organic aliphatic, alicyclic, or oxygen-containing heterocyclic acids. By the term "aliphatic acid" is meant any open chain carboxylic acid substituted if desired, with nonreactive groups, such as halogen, sulfur and hydroxyl. By the term "alicyclic" it will be understood that there is intended any cyclic acid in which the ring is nonaromatic and composed solely of carbon atoms, and such acids may if desired have inert, nonreactive substituents such as halogen, hydroxyl, alkyl radicals, alkenyl radicals and other carbocyclic ring structures condensed therewith. Exemplary of such acids are acetic, propionic, butyric, valeric, hexanoic, ethylheptanoic, n-octanoic, iso-octanoic, capric, undecanoic, lauric, myristic, palmitic, stearic, oleic, ricinoleic, behenic; chlorocaproic and hydroxycapric acids.

As typical examples of benzophenones that are intended to be included within the scope of this invention may be mentioned the following:

2-hydroxybenzophenone,
2-hydroxy-4-bromobenzophenone,
2-hydroxy-4-methylbenzophenone,
2-hydroxy-4-iodobenzophenone,
2-hydroxy-4-pentachlorobenzophenone,
2-hydroxy-4-benzyloxybenzophenone,
2-hydroxy-4,5-dimethylbenzophenone,
2-hydroxy-4-benzyloxy-5-chlorobenzophenone,
2-hydroxy-5-hexyl-2',4-dimethylbenzophenone,
2-hydroxy-4-(3,4-dichlorobenzyloxy)-4'-t-butylbenzophenone,
2-hydroxy-3-methyl-4'-nitrobenzophenone,
2-hydroxy-4-hexylbenzophenone,
2-hydroxy-4-benzyloxy-2',4',5'-trichlorobenzophenone,
2-hydroxy-4-ethyl-3'-chlorobenzophenone,
2,4-dihydroxybenzophenone,
2,2',4-trihydroxybenzophenone, and
4-n-decyloxy-2,2'-dihydroxybenzophenone.

The aromatic oxime component, that is, the metal-containing compound or chelate complex used according to the invention is one of nickel, cobalt or chromium with an aromatic oxime containing a phenolic hydroxyl group.

As aromatic oximes from which the chelate complexes are derived there may be mentioned oximes of carbonyl compounds of the type for example Ar.CO.Y wherein Ar is an aromatic radical such as phenyl, α- or β-naphthyl which carries a phenolic hydroxyl group in the ortho position to the carbonyl group and can have other substituents selected from such as a hydrocarbon group for example an alkyl group such as methyl, isopropyl or tert-butyl, nonyl, lauryl or tert-octyl, α-methylcyclohexyl or phenyl, a halogen atom such as chlorine, an alkoxy group such as methoxy or octyloxy, or a nitro group, and Y is a hydrogen atom or an optionally substituted hydrocarbon radical, such as an alkyl group for example methyl, or β-hydroxyethyl, a cycloalkyl group for example cyclohexyl, or an aromatic radical for example phenyl, α- or β-naphthyl, substituted phenyl such as hydroxyphenyl, or a heterocyclic radical such as furyl, pyridyl or thienyl.

The phenolic hydroxyl group and the oxime group must be positioned so that chelation is possible, the metal atom replacing the hydrogen atom of the phenolic hydroxyl group and being chelated with the nitrogen atom of the oxime group. The hydroxyl group may for example be in a position ortho to the point of attachment on the aromatic ring of the carbonyl group from which the oxime group is derived and the oxime is the syn-configuration, with respect to Y.

Superior stabilization effects are in general obtained by the use of chelate complexes derived from ketoximes rather than from aldoximes, i.e. from oximes obtained from carbonyl compounds of the type Ar.CO.Y where Y is not a hydrogen atom, and particularly from ketoximes derived from a carbonyl compound wherein Y is aliphatic or cycloaliphatic, e.g. alkyl, substituted alkyl or cycloalkyl. Superior stabilization is also in general obtained, especially when Y is chosen from one of the preferred classes of groups, by the use of oximes derived from carbonyl compounds of the formula Ar.CO.Y wherein Ar is a hydroxyl substituted phenyl nucleus rather than for example a hydroxyl substituted naphthyl nucleus.

Particularly effective stabilization is obtained by the use of cobalt and, especially, nickel chelate complexes which are now preferred.

In the chelate complexes used in the process of the invention one molecular proportion of the metal ion is associated with a number, equal to the valency of the metal, of molecular proportions of the ligand (that is the oxime molecule from which one atom of hydrogen is lost).

Examples of chelate complexes which may be used are nickel bis-complexes, chromium tris-complexes and cobalt tris-complexes of syn-methyl-2-hydroxyl-4-methylphenylketoximes,
syn-phenyl-2-hydroxy-4-heptoxyphenyl-ketoxime,
syn-2-hydroxynaphthylaldoxime,
syn-methyl-2-hydroxy-5-tert.-octylphenylketoxime,
syn-phenyl-2-hydroxynaphthylketoxime,
syn-methyl2-hydroxy-5-methylphenylketoxime and
syn-methyl-2-hydroxy-5-nitrophenylketoxime.

As noted the components of the synergistic combination of the invention are known in the art. Their preparation is known.

A thermal stabilizer can also be included in the composition of the invention, for example, for best results with, say, polypropylene, a thermal stabilizer together with the UV stabilizer system is used to make the polypropylene most useful.

Propylene requires a thermal stabilizer as well as the UV stabilizer system to be most useful. Suitable thermal stabilizers include a phenolic such as octadecyl[3-(3,5-di-t-butyl-4-hydroxyphenyl)] propionate,
2,6-di-t-butyl-4-methylphenol,
1,3,5-trimethyl-2,4,6-tris(3,5-di-t-butyl-4-hydroxybenzyl) benzene,
di-n-octadecyl(3,5-di-t-butyl-4-hydroxybenzyl) phosphonate,
tetrakis[methylene(3,5-di-t-butyl-4-hydroxyhydrocinnamate)] methane and the like.

The weight ratio of the hydroxybenzophenone component and the metal or nickel ketoxime component can vary from about 5 to 1 to about 1 to 5. Particularly good results are obtained with a ratio of about 2.3 to 1.

The amount of the UV stabilizing system to add to the polyolefin can vary from about 0.05 to 5 parts per 100 parts polymer (p.h.p.). It is presently preferred to add about 0.1 to 2.5 p.h.p., however. The amount of thermal stabilizer to add to the polymer or copolymer can vary from about 0.002 to about 2.0 p.h.p. with 0.02 to 0.5 p.h.p. presently preferred.

Other stabilizers, pigments, processing aids, antistatic agents and the like can be added to the formulations as desired or required.

The data herein show ratios of NA to UV–531, ranging from about 0.4 to 1 to about 2.3 to 1 and that as the ratio of NA to UV–531 decreases, the effectiveness of the system to improve the UV resistance of the polymer composition increases.

EXAMPLE

Samples were prepared by wet blending using n-hexane, masticating in a Brabender plastigraph at 200° C. for five minutes under a nitrogen atmosphere and compression molding to 5-mil thick film. Samples were exposed in a twin enclosed carbon arc Weather-Ometer operated without the spray cycle and modified by the incorporation of 8 fluorescent sunlamps. Triplicate film samples were tested ever 20 hours by subjecting to the flex-bend test. Samples and their time to failure were as follows.

| Sample No. | Composition (all in 3MF p.p.) | Average hours to failure |
|---|---|---|
| 1 | Control—0.05 p.h.p. Irganox 1076 | 80 |
| 2 | 0.5 p.h.p. UV-531 [1] | 487 |
| 3 | 0.5 p.h.p. Negopex A [1] | 420 |
| 4 | {0.25 p.h.p. UV-531 [1] / 0.25 p.h.p. Negopex A} | 820 |
| 5 | {0.15 p.h.p. UV-531 [1] / 0.35 p.h.p. Negopex A} | 640 |
| 6 | {0.15 p.h.p. Negopex A [1] / 0.35 p.h.p. UV-531} | 1,000 |
| 7 | 3MF polypropylene as received | 53 |

[1] Also contain 0.05 p.h.p. Irganox 1076 (a higher molecular weight hindered phenol thermal stabilizer).

These results show dramatically the synergism between UV-531 and Negopex A (a trademark, NA) when used in combination to protect polypropylene from UV light.

Reasonable variation and modification are possible within the scope of the foregoing disclosure and the appended claims to the invention, the essence of which is that a combination of known stabilizers as herein described have been found to exhibit a marked synergistic effect in the stabilization of polymers and copolymers of 1-olefins, also as described.

What is claimed is:
1. A light stabilized material selected from a homopolymer and a copolymer of a 1-olefin having 2–8 carbons to the molecule which comprises incorporated therein a stabilizing amount of a synergistic combination comprising a minor amount of one of each of

(1) a 2-hydroxy-4-alkoxybenzophenone having the following general formula

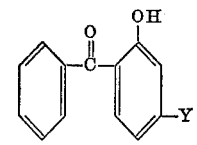

wherein Y is an alkoxy radical containing from 1 to about 30 carbon atoms,
(2) a metal chelate complex with a syn-alkyl-2-hydroxy-group contains from 1–12 carbon atoms ultraviolet light stabilizer and
and
(3) a thermal stabilizer.

2. A stabilized material according to claim 1 wherein the weight ratio of the component hydroxybenzophenone stabilizer and the component metal ketoxime component is within the range of from about 5 to 1 to about 1 to 5 and the total amount of the stabilizing system of said components added to the polymer or copolymer is within the range of from about 0.1 to 2.5 parts per hundred parts of the material to be stabilized.

3. A stabilized material according to claim 2 wherein the polymer is a polymer of propylene and the copolymer is a polymer of propylene with a 1-olefin containing 2–8 carbon atoms to the molecule.

4. A stabilized material according to claim 3 wherein the hydroxybenzophenone is a 2-hydroxy-4-n-alkoxybenzophenone containing 1–10 carbons in the alkoxy group and wherein the metal chelate complex is nickel bis(syn-methyl-2-hydroxy-4-methylphenylketoxime).

5. A stabilized material according to claim 4 wherein the thermal stabilizer is 2,6-di-t-butyl-4-methylphenol.

References Cited
UNITED STATES PATENTS

| 2,976,259 | 3/1961 | Hardy et al. | 260—45.95 |
| 2,980,646 | 4/1961 | Lappin | 260—45.95 |
| 3,459,703 | 8/1969 | Briggs et al. | 260—45.75 |

OTHER REFERENCES

Bulletins M-684 and M-707A of May 1963 and July 1964, respectively, on Irganox Compds., Geigy Chemical Industrial Chemicals, Ardsley, N.Y.

DONALD E. CZAJA, Primary Examiner

V. P. HOKE, Assistant Examiner

U.S. Cl. X.R.

260—45.85 B, 45.95 H, 45.95 R, 45.95 D

UNITED STATES PATENT OFFICE

CERTIFICATE OF CORRECTION

Patent No. 3,786,021           Dated: January 15, 1974

Ronald D. Mathis et al.

It is certified that error appears in the above-identified patent and that said Letters Patent are hereby corrected as shown below:

Column 6, at end of line 11 after the hyphen the following should be added:

— 4-alkyl-substituted phenyl ketoxime in which the alkyl —

Column 6, line 14, delete "and".

Signed and sealed this 1st day of October 1974.

(SEAL)
Attest:

McCOY M. GIBSON JR.
Attesting Officer

C. MARSHALL DANN
Commissioner of Patents